Patented Apr. 21, 1942

2,280,135

UNITED STATES PATENT OFFICE 2,280,135

CONDUCTIVE COATING FOR GLASS AND METHOD OF APPLICATION

Theodore W. H. Ward, New York, N. Y.

No Drawing. Application February 21, 1940, Serial No. 320,130

3 Claims. (Cl. 250—141)

This invention pertains to metallic coating compositions for application to glass or similar vitreous or other electrically non-conductive surfaces, to methods of applying such coatings, and to articles embodying the same.

The principal object of the invention is to provide tough and adherent, electrically conductive coatings on glass and the like, which coatings are further characterized in providing substantially matte and non-reflecting metallic surfaces, such as are required on the interior walls of certain types of electric bulbs or tubes, for example, thermionic or gaseous discharge tubes, and particularly along the interior side walls of cathode ray television tubes and radio tubes.

In the operation of television systems employing cathode ray tubes, it is necessary to use on the interior side walls of such tubes an electrically conductive coating having a substantially non-reflecting, matte surface. Heretofore, a graphite coating has been employed for this purpose, the graphite being initially suspended in a suitable aqueous carrier and the coating applied by brushing. Such a coating is, however, objectionable because, on evaporation of the carrier, the graphite adheres but loosely to the glass, and soon flakes off, initially in spots. The graphite coating is further objectionable in that it retains gases, which tend to produce subsequent discoloration of the projection screen.

Although various expedients are known for applying metallic or conductive coatings to glass, as for example, by mirroring, vaporization of metals thereon, etc., such expedients are objectionable in one or more respects, viz., the coatings are not sufficiently adherent or conducting, are highly reflecting, or do not provide sufficiently matte or light impervious surfaces.

In accordance with the present invention, I propose to employ for said purposes, coating compositions consisting of one or more metals, such as nickel, tin, bismuth, cadmium, chromium, silver and the like, in the form of flakes or flake pastes, dispersed in an appropriate liquid dispersing agent, whereby the coating may be applied by brushing or spraying. As dispersing agents, I may employ for controlling the viscosity and flow, varnishes or the like containing solid or plastic constituents, such as natural and synthetic resins, cellulose derivatives, oils, paraffins, for example, short oil modified glyptals, ethyl cellulose, etc., dissolved in appropriate volatile solvents, such as alcohols, esters, ethers, liquid hydrocarbons, for example, xylol, toluol, etc. The metallic flakes may also be dispersed in aqueous media, such for example as aqueous solutions of gum tragacanth, sulfonated castor oil, etc. In addition to the metals above referred to, aluminum flakes may also be employed but with results which are not so satisfactory.

Although the proportions in which the metallic flakes, non-volatile constituents, and volatile solvents, are combined to provide the metallic coating compositions in accordance with the invention, are not particularly critical, nevertheless the best results are obtained within the following ranges:

| | Parts |
|---|---|
| Metallic flakes | 100 |
| Organic film-forming constituents (resins, etc.) | Up to about 25 |
| Solvents (alcohol, toluol, etc.) | 5 to 200 |

No low limit is specified for the film-forming constituents, inasmuch as with certain ingredients that may be used, for example, algin, a high viscosity is obtained when present to the extent of but a fraction of a per cent. Also where certain oils, for example, are employed as the dispersing agent, no solvent is required. The coating compositions in accordance with the invention should ordinarily contain, in the form applied, upwards of 25% of the metallic flakes, in order to assure adequate electrical continuity of the metallic film after baking.

The coating compositions in accordance with the invention are, as stated, preferably applied to the glass by brushing or spraying, following which the glass article is baked to evaporate the volatile solvents, and also to volatilize or carbonize the film-forming constituents, i. e. resins, oils, etc. Preferably the baking is carried out at about 400° C. for an interval of twenty minutes to an hour or more depending on the particular coating composition employed. For some compositions, temperatures as low as 250 to 300° C. may be used. The purposes of the baking are to remove virtually all organic matter from the coating, to render the coating highly conducting electrically, and to cause it to adhere to the glass, etc., in the form of a substantially non-reflecting and light impervious matte surface.

In the application of my coating compositions more particularly to cathode ray television tubes, it is customary to apply first to the projection end of the tubes, the composition for the projection screen. Thereafter, an electrically conductive coating in accordance with my composition is applied to the side walls of the tube. At this stage of the process, it is preferable to run a stream of air into the tube for a few seconds in order to evaporate the volatile solvent and allow the coating film to set. The tube is then baked as aforesaid, usually at a temperature of about 400° C. for about twenty minutes to an hour, in order to complete the volatilization of the solvent and to completely volatilize or carbonize the film-forming resinous or like constituents.

During this baking process, the tube is evacuated in order to exhaust air and gases therein as completely as possible.

It is essential that the baking be effected at such temperature and for such time as to eliminate all organic material from the coating, either by volatilization or carbonization thereof, as otherwise the electrical conductivity of the resulting metallic coating would be impaired, and furthermore should organic substances or gases be retained after the baking process, these would tend to discolor the projection screen. For the latter reason also, the materials employed in the coating compositions of the invention must be free from all but the slightest trace of such impurities as iron, copper, etc., which react deleteriously on the projection screen, as for example by discoloring the same.

Where it becomes necessary or advisable to bake the glass, etc., articles, coated in accordance with the invention, at lower temperatures, say of the order of 250 to 300° C., it becomes important to employ a dispersing agent for the metallic flakes, which volatilizes at or below these temperatures. In such cases, it may for the same reason become necessary to clean or "degrease" the metallic flakes prior to incorporation in the coating composition. The reason for this is that in the manufacture of such flakes, it is customary to employ an oleaginous or unctuous substance, such as a higher fatty acid, as for example, stearin, which substance would not be completely removed by baking at such temperatures.

As examples of coating compositions in accordance with the invention, I give the following:

*Example 1*

|  | Grams |
|---|---|
| Tin flakes | 50 |
| Nickel flakes | 50 |
| Short oil modified glyptal | 5 |
| Toluol | 35 |

*Example 2*

| Tin or nickel flakes | 100 |
|---|---|
| Oil modified glyptal | 2 |
| Mineral spirits | 35 |

*Example 3*

| Tin and nickel flakes (equal parts) | 100 |
|---|---|
| Ethyl cellulose | 2 |
| Toluol and alcohol | 63 |

*Example 4*

| Tin and nickel flakes (equal parts) | 100 |
|---|---|
| Urea aldehyde resin | 7.5 |
| Butyl alcohol | 20 |
| Xylol | 20 |

*Example 5*

| Tin and nickel flakes (equal parts) | 100 |
|---|---|
| Camphor | 7.5 |
| Toluol | 50 |

*Example 6*

| Tin and nickel flakes (equal parts) | 100 |
|---|---|
| Methyl cellulose | 2 |
| Water | 30 |

It is often desirable to coat television tubes and the like, without blowing air into them before baking. Under these conditions, it is necessary to use a fast drying solvent, such as toluol, and a very low percentage of a high viscosity film-forming material, such as ethyl cellulose. Formula 3 is a good example of a coating composition suitable in such cases.

I claim:

1. A conductive coating composition for forming an opaque coating of low light reflectivity on glass and the like, comprising metal of the group consisting of nickel, tin, bismuth, cadmium, chromium and silver, in the form of finely divided flakes, dispersed in a liquid medium comprising a film-forming organic substance and a volatile solvent therefor.

2. A cathode ray tube of vitreous material having on its interior side walls a tenaciously adhering, substantially opaque, conductive coating of low light reflectivity, comprising finely divided metal flakes of the group consisting of nickel, tin, bismuth, cadmium, chromium and silver, applied in liquid dispersion in a film-forming organic solution and baked on.

3. A cathode ray tube having on its interior side walls a tenaciously adhering, substantially opaque, conductive coating of low light reflectivity, comprising finely divided metal flakes applied in liquid dispersion in a film-forming solution and baked on.

THEODORE W. H. WARD.